United States Patent
Zhang et al.

(10) Patent No.: US 9,345,358 B2
(45) Date of Patent: May 24, 2016

(54) ELECTRIC STEAMER AND CONTROL METHOD THEREOF

(75) Inventors: Bei Zhang, Shenzhen (CN); Tianliang Wang, Shenzhen (CN)

(73) Assignee: CRASTAL TECHNOLOGY (SHENZHEN) CO., LTD., Shenzhen (CN)

( * ) Notice: Subject to any disclaimer, the term of this patent is extended or adjusted under 35 U.S.C. 154(b) by 581 days.

(21) Appl. No.: 13/703,346

(22) PCT Filed: May 24, 2011

(86) PCT No.: PCT/CN2011/074563
§ 371 (c)(1),
(2), (4) Date: Dec. 10, 2012

(87) PCT Pub. No.: WO2011/160525
PCT Pub. Date: Dec. 29, 2011

(65) Prior Publication Data
US 2013/0098892 A1 Apr. 25, 2013

(30) Foreign Application Priority Data
Jun. 22, 2010 (CN) .......................... 2010 1 0206115

(51) Int. Cl.
*A47J 27/04* (2006.01)
*A47J 36/00* (2006.01)
*G05B 19/04* (2006.01)

(52) U.S. Cl.
CPC ............ *A47J 27/04* (2013.01); *A47J 2027/043* (2013.01)

(58) Field of Classification Search
None
See application file for complete search history.

(56) References Cited

U.S. PATENT DOCUMENTS

| 2,691,090 | A | * | 10/1954 | Vischer, Jr. | ......... A47J 27/0802 200/83 R |
| 2,771,536 | A | * | 11/1956 | Page | ..................... A47J 27/004 200/82 R |
| 2,984,171 | A | * | 5/1961 | Lee, Sr. | ................. A47J 27/086 126/369 |
| 3,583,307 | A | * | 6/1971 | Lee, Sr. | ................. A47J 27/086 126/59.5 |
| 5,865,104 | A | * | 2/1999 | Sham | ...................... A47J 27/04 126/369.1 |

(Continued)

FOREIGN PATENT DOCUMENTS

| CN | 200980575 Y | * | 11/2007 | |
| CN | 201452838 U | * | 5/2010 | |
| WO | WO 2011117659 A1 | * | 9/2011 | ............... A47J 27/04 |

*Primary Examiner* — Joseph M Pelham
(74) *Attorney, Agent, or Firm* — Raymond Y. Chan; David and Raymond Patent Firm

(57) ABSTRACT

An electric steamer includes a cover (1), at least one steamer (2), a juice accumulating plate (3) and a base (4) which are overlapped sequentially from top to bottom. A water storage pool (41) and a control circuit are arranged in the base (4). A pressure sensor (7) is also mounted in the base (4). A steam inlet pipe (72) of the pressure sensor (7) is connected with the juice accumulating plate (3) and a signal output terminal of the pressure sensor (7) is connected with the control circuit through a wire. A steam delivering device (8) is provided between the steam inlet pipe (72) and the juice accumulating plate (3). An upper end of a steam channel (81) is connected with the juice accumulating plate (3). A method for controlling the electric steamer is further provided.

14 Claims, 5 Drawing Sheets

(56) References Cited

U.S. PATENT DOCUMENTS

| | | | | |
|---|---|---|---|---|
| 5,869,812 A * | 2/1999 | Creamer | F24C 15/327 | 126/20 |
| 6,107,605 A * | 8/2000 | Creamer | A21B 3/04 | 126/20 |
| 6,175,100 B1 * | 1/2001 | Creamer | A21B 3/04 | 126/20 |
| 6,267,046 B1 * | 7/2001 | Wanat | A47J 27/05 | 99/332 |
| 6,453,802 B1 * | 9/2002 | Manganiello | A21B 3/04 | 126/20 |
| 7,091,455 B2 * | 8/2006 | Fung | A47J 27/2105 | 219/429 |
| 7,718,928 B2 * | 5/2010 | He | A47J 27/09 | 219/431 |
| 8,544,381 B2 * | 10/2013 | Cartigny | A47J 27/0813 | 219/440 |
| 2003/0178411 A1 * | 9/2003 | Manganiello | A47J 27/04 | 219/496 |
| 2006/0120700 A1 * | 6/2006 | Moore, Jr. | A47J 27/16 | 392/386 |
| 2010/0086287 A1 * | 4/2010 | Rosenzweig | F22B 1/285 | 392/387 |
| 2010/0199860 A1 * | 8/2010 | Seitz | A21B 3/04 | 99/468 |
| 2012/0222562 A1 * | 9/2012 | Mohammed | A47J 27/04 | 99/341 |
| 2012/0295002 A1 * | 11/2012 | Seitz | A23L 1/0121 | 426/510 |
| 2012/0318252 A1 * | 12/2012 | Seitz | A47J 27/04 | 126/20 |
| 2015/0223627 A1 * | 8/2015 | Li | A47J 27/04 | 99/337 |

\* cited by examiner

ELECTRIC STEAMER AND CONTROL METHOD THEREOF

BACKGROUND OF THE PRESENT INVENTION

1. Field of Invention

The present invention relates to a domestic appliance, and more particularly to an electric steamer and a control method thereof.

2. Description of Related Arts

In recent years, there has been a change in the eating habit for families in that people are changing from such conventional cooking methods as pan frying, deep frying and frying to steaming. The reason is that cooking food by steaming is much healthier than pan frying and deep frying. A conventional electric steamer usually utilizes mechanical temperature control and timer for controlling the cooking parameters of the electric steamer. Some conventional electric steamers utilize electrical temperature and timer control. There have been many developments in the control technology for electric steamers, and conventional electric steamers have been equipped with multi-functional control technology. A conventional steaming process comprises the following steps: first a user needs to add water into the electric steam. Second, the user needs to put a predetermined amount of food into the steamer. Third, the steamer is electrically connected to a power supply. Fourth, the user sets up all the steaming parameters for the electric steamers. Fifth, the user needs to start the electric steamer for steaming the food. When the steaming process is activated, the electric steamer is arranged to heat up the water stored therein for steaming the food for a predetermined period of time. When the steaming time lapses, the electric steamer is turned off automatically and the steaming process is completed.

Conventional steaming technology includes digital steaming control technology which is capable of using high power to heat up the water in the steamer during an initial period of the steaming and decreasing the power gradually after a predetermined period of steaming time has lapsed. This technology facilitate saving of energy by optimally controlling the power used for steaming. For example, a Chinese patent having a patent number of 200820092116.2 and a filing date of Feb. 1, 2008 discloses an electric steamer comprising a base, a water tank assembly supported by the base, a heating assembly, a ventilation arrangement, a food rack, a cover, a control circuitry, a circuit board, a control panel, and a partitioning member provided between the base and the food rack, wherein the heating assembly is disposed in the water tank assembly. Moreover, the water tank assembly is embodied as a flat heating element, and has a protective cover provided at a peripheral rim of the flat heating element.

Such conventional electric steamer has several disadvantages. First, the amount of steam produced by the conventional electric steamer is usually independent of the amount of food disposed therein. Thus, when a user put only a small amount of food in the electric steamer, the heat absorbed by the food is correspondingly small. However, the amount of steam generated by the electric steamer is not adjustable and remains largely constant. This makes the electric steamer generate an excessive amount of steam in this particular occasion. This excessive amount of steam is uncontrollably ejected from the electric steamer. Moreover, a lot of hot water may also come out from the cover which poses a danger to the user of the conventional electric steamer. The spilling of hot water or the ejection of the excessive steam makes the surrounding area of the electric steamer dirty, and generates a considerable waste of energy. On the other hand, when the user puts a lot of food into the electric steamer, since the amount of steam generated by the electric steamer is largely constant, the food may not be exposed to adequate account of steam and may not be fully cooked. Second, when the user wishes to add some more ingredients into the electric steamer, the conventional electric steamer may not be capable of promptly generating more steam so as to cope with the increased demand of food.

SUMMARY OF THE PRESENT INVENTION

The invention is advantageous in that it provides an electric steamer which is energy efficient, and is capable of providing an optimal amount of steam according to the amount of food put into the electric steamer. Moreover, during a steaming process, the electric steam will not generate an excessive amount of steam or hot water spilling out of the electric steamer due to too much or too less food disposed in the electric steamer. Furthermore, when the electric steamer is opened during a steaming process, it can respond promptly and increase the amount of steam produced to compensate the loss of steam or temperature.

Another advantage of the invention is to provide a steam arrangement for the electric steamer which is capable of decreasing the amount of steam entering to the pressure sensor when the flow rate of the steam in the electric steamer is excessively high.

Another advantage of the invention is to provide an electric steamer with enhanced sealing property.

Additional advantages and features of the invention will become apparent from the description which follows, and may be realized by means of the instrumentalities and combinations particular point out in the appended claims.

According to the present invention, the foregoing and other objects and advantages are attained by an electric steamer which comprises a steamer cover, at least one steamer chamber, a fluid receiving unit and a base sequentially arranged from a top to a bottom of the electric steamer, wherein the base has a water chamber and a control circuit is provided in the base, wherein the base further comprises a pressure sensor and a pressure sensor inlet pipe connected to the fluid receiving unit, wherein the pressure sensor has a signal output terminal connected to the control circuit through a connecting wire.

According to the present invention, the electric steamer further comprises a steam arrangement between the pressure sensor inlet pipe and the fluid receiving unit such that the pressure sensor inlet pipe is connected to the fluid receiving unit, wherein the steam arrangement comprises a steam channel and a pressure detecting chamber, wherein the pressure sensor inlet pipe is mounted inside the pressure detecting chamber, wherein the steam channel is connected to the fluid receiving unit through an upper end of the steam channel, wherein the pressure detecting chamber has a chamber inlet which is arranged to connect to the steam channel.

According to the present invention, the fluid receiving unit further comprises a stair-shaped member at a bottom portion of the fluid receiving unit, wherein the upper end of the steam channel is connected within the stair-shaped member. The provision of the stair-shaped member is to prevent any fluid condensate from entering into the water chamber through the upper end opening of the steam channel.

According to the present invention, the chamber inlet is positioned towards a bottom portion of the pressure detecting chamber, wherein the chamber inlet is positioned at a level higher than a maximum water level required by the water chamber.

According to the present invention, the steam channel has a bottom end and a water returning hole is provided at the bottom end of the steam channel, wherein the water returning hole is positioned at a level lower than a minimum water level required by the water chamber.

According to the present invention, the steam channel has an upper end and a residual gas outlet provided at the upper end of the steam channel, wherein the residual gas outlet is positioned at a level higher than the maximum water level required by the water chamber.

According to the present invention, the pressure detecting chamber further comprises a chamber partition panel, wherein the chamber partition panel divides the pressure detecting chamber into two chamber compartments, wherein the chamber inlet and the inlet pipe are provided in the two chamber compartments respectively, wherein the chamber partition panel has a bottom portion at which a partition hole is provided such that the two chamber compartments are capable of communicating with each other.

According to the present invention, an upper end of the inlet pipe is positioned at a level higher than that of an upper end of the partition hole.

According to the present invention, an upper end of the inlet pipe is positioned at a level higher than that of an upper end of the chamber inlet.

According to the present invention, the inlet pipe is outwardly protruded from a bottom surface of the pressure detecting chamber.

According to the present invention, the electric steamer further includes a temperature sensor positioned in the steam chamber for detecting a temperature inside the steam chamber serving as controlling data reference.

According to the present invention, a protruded ring I and a water groove I are provided at a connecting junction between the steamer cover and the steam chamber.

According to the present invention, a protruded ring II and a water groove II are provided at a connecting junction between the steam chamber and the fluid receiving unit.

According to the present invention, when water condensate shield is provided at the upper end of the inlet pipe, the steam arrangement can be omitted and the inlet pipe is protruded from the bottom surface of the fluid receiving unit directly.

According to a control method of an electric steamer of the present invention, the steps are as follows:

(1) detecting a working status of a pressure sensor through a control circuit of the electric steamer;

(2) analysis the working status of the pressure sensor through the control circuit, if the working status meets a preset programming parameter, disconnecting a power supply to a heating unit of the electric steamer; if the working status does not meet the preset programming parameter, connecting the power supply to the heating unit; and (3) the control circuit disconnecting the power supply to the heating unit and stopping a steaming and cooking process of the electric steamer if a preset steaming and cooking time is reached.

In the step (1), the working status of the pressure sensor is in the form of an output voltage value.

In the step (1), the working status of the pressure sensor is in the form of a connect status or a disconnect status of the pressure sensor.

Compared to the conventional technology, the provision of pressure sensor in the electric steamer can effectively control the heating process of the heating unit of the electric steamer and control the electric steamer to operate under sufficient steam condition for steaming and cooking food object, therefore solving the problems of different steaming and cooking requirements for different types of food object with food quantity variation in the steam chamber. At the same time, the problems of hot gas emission and uncontrollable steam and gas ejection are solved. Accordingly, the electric steamer can provide a suitable condition for steaming and cooking food object, eliminating the safety hazards and is therefore safe to use while is energy saving. Therefore, the food object prepared by the electric steamer is cooked properly in a controlled manner and has a desirable texture.

According to the present invention, a steam arrangement is provided. When the flow rate of the steam inside the steam chamber is excessive high, the steam arrangement can buffer the steam and reduce the flow rate of the steam before entering into the pressure sensor, thereby reducing the impact of the steam towards the pressure sensor. The steam arrangement can also prevent a large amount of water condensate from entering into the inlet pipe.

According to the present invention, because a protruded ring I and a water groove I are provided at a connecting junction between the steamer cover and the steam chamber and a protruded ring II and a water groove II are provided at a connecting junction between the steam chamber and the fluid receiving unit, a water sealing environment is provided at the connecting junction between the steamer cover and the steam chamber and at the connecting junction between the steam chamber and the fluid receiving unit when water is filled inside the water groove I and the water groove II during operation of the electric steamer, thereby greatly increasing the sealing condition of the steam chamber with a simple arrangement.

Still further objects and advantages will become apparent from a consideration of the ensuing description and drawings.

These and other objectives, features, and advantages of the present invention will become apparent from the following detailed description, the accompanying drawings, and the appended claims.

NUMERICAL REFERENCE IN THE DRAWINGS

1—steamer cover; 2—steam chamber; 3—fluid receiving unit; 4—base; 5—heating unit; 6—partition member; 7—pressure sensor; 8—steam arrangement; 9—sealing unit; 11—protruded ring I; 21—water groove I; 22—protruded ring II; 31—water inlet; 32—gas outlet; 33—fluid receiving chamber; 34—water groove II; 35—stair-shaped member; 41—water chamber; 42—water chamber outer wall; 43—base cavity; 71—sampling port; 72—inlet pipe; 81—steam channel; 82—pressure detecting chamber; 811—residual gas outlet; 812—water returning hole; 813—steam channel outer wall; 815—water returning hole II; 821—chamber inlet; 822—chamber partition panel; 823—chamber side panel; 824—chamber bottom panel; 8221—partition hole

DETAILED DESCRIPTION OF THE PREFERRED EMBODIMENT

The present invention is further described with the following embodiments and the accompanying drawings to illustrate the technical problems, the technical solutions and the advantageous effect of the present invention.

Embodiment 1

Figure 1:
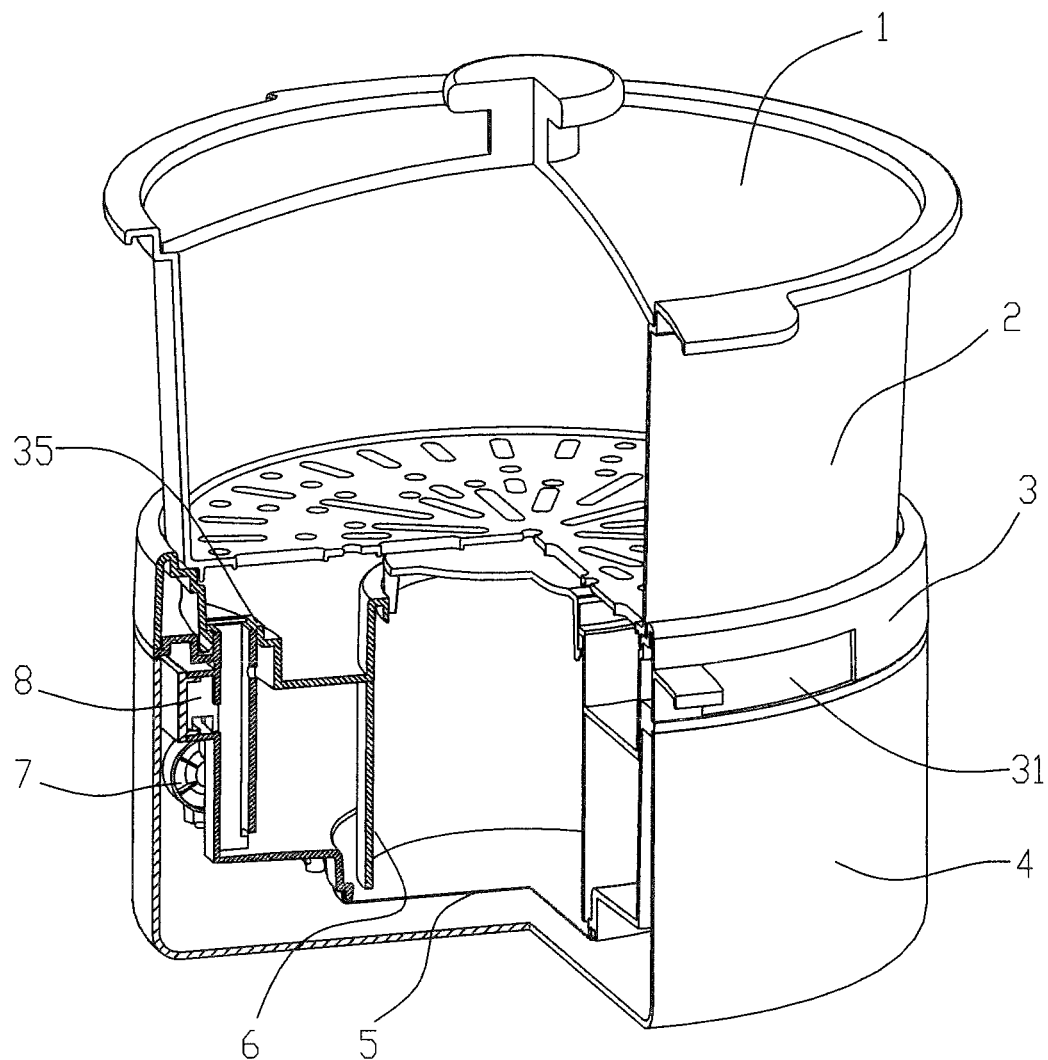
FIG. 1 is a perspective view of an electric steamer according to a first preferred embodiment of the present invention.
Figure 2:
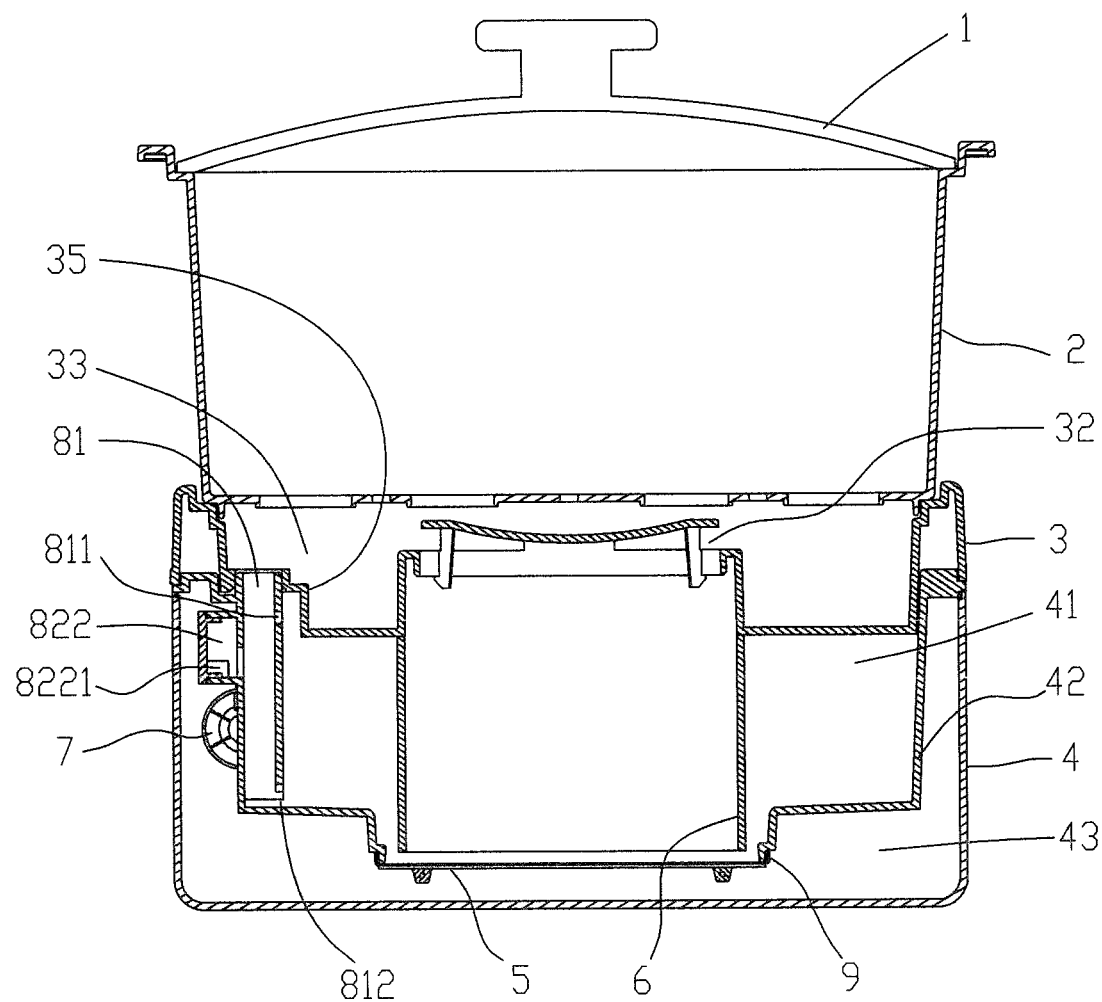
FIG. 2 is an exploded view of the electric steamer according to the above first preferred embodiment of the present invention.
Figure 3:
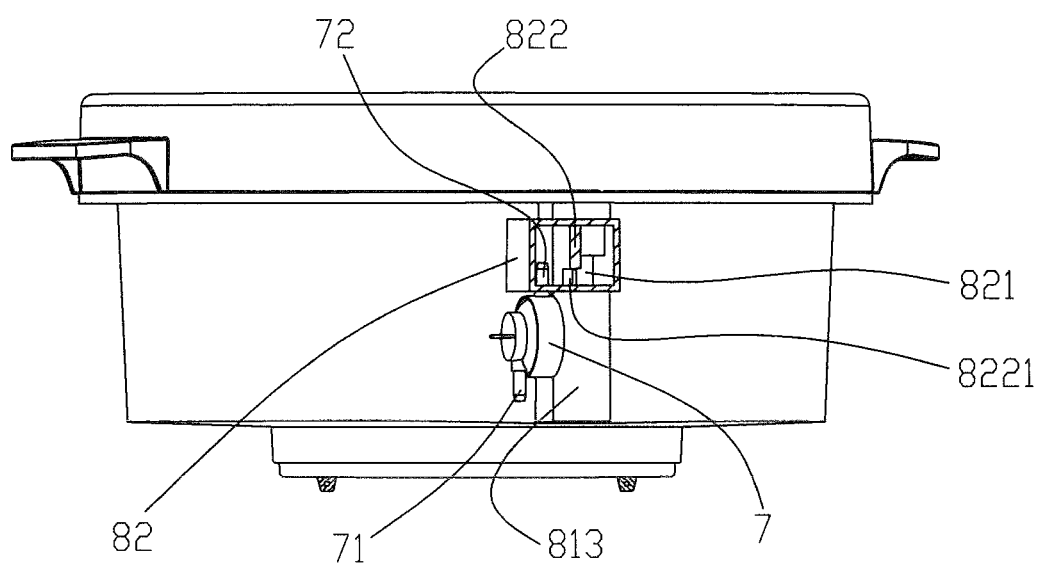
FIG. 3 is an illustration of the pressure detecting chamber steamer according to the above first preferred embodiment of the present invention.

Referring to FIG. 1, FIG. 2 and FIG. 3 of the drawings, the electric steamer according to this preferred embodiment of the present invention includes a steamer cover 1, a steamer chamber 2, a fluid receiving unit 3 and a base 4 sequentially arranged from a top to a bottom of the electric steamer. The fluid receiving unit 3 has a water inlet 31, a gas outlet 32 and a fluid receiving chamber 33. The base 4 comprises a heating unit 5 and a water chamber 41 and has a base cavity 43. The base cavity 43 is formed between a water chamber outer wall 42 and an outer casing of the base 4. A control circuit and a pressure sensor 7 are provided in the base cavity 43. The base 4 further comprises a pressure sensor inlet pipe 72 connected to the fluid receiving unit 3. The pressure sensor 7 has a signal output terminal connected to the control circuit through a connecting wire. A partition member 6 is provided on top of the heating unit 5. A sealing unit 9 is provided at the junction between the heating unit 5 and the water chamber outer wall 42. The Chinese utility model patent number 200920132752.8 with a filing date of Jun. 12, 2009 can also be referred for the construction of an electric steamer.

Referring to FIG. 2 of the drawings, a steam arrangement 8 is provided between the pressure sensor inlet pipe 72 and the fluid receiving unit 3 such that the pressure sensor inlet pipe 72 is connected to the fluid receiving unit 3. The steam arrangement 8 comprises a steam channel 81 and a pressure detecting chamber 82. The steam channel 81 and the pressure detecting chamber 82 are both integrally connected to the water chamber outer wall 42 respectively. The pressure sensor inlet pipe 72 is mounted inside the pressure detecting chamber 82. An upper end of said steam channel 81 is connected to the fluid receiving unit 3. The pressure detecting chamber 82 has a chamber inlet 821 connected to the steam channel 81. The steam channel 81 is an opening provided at an upper end of the steam arrangement 8. A water returning hole 812 which is a rectangular tubular member construction is provided at a bottom end of the steam arrangement 8. The position of the water returning hole 812 is at a level lower than a minimum water level required by the water chamber 41. A bottom portion of the fluid receiving unit 3 further comprises a stair-shaped member 35. An upper end of the steam channel 81 is connected within the stair-shaped member 35.

The chamber inlet 821 is positioned towards a bottom portion of the pressure detecting chamber 82. The chamber inlet 821 is positioned at a level higher than a maximum water level required by the water chamber 41. The reason for positioning the chamber inlet 821 towards the bottom portion of the pressure detecting chamber 82 is to facilitate the fully discharge of the water after condensation in the pressure detecting chamber 82. The reason for positioning the chamber inlet 821 at a level higher than the maximum water level required by the water chamber 41 is to prevent water flowing from the inlet pipe 72 to the pressure sensor 7 when excess water is added to the electric steamer.

Referring to FIG. 3 of the drawings, a chamber side panel 823 of the pressure detecting chamber 82 is removed for exposing the interior features of the electric steamer of the present invention. The pressure detecting chamber 82 comprises a chamber partition panel 822 which divides the pressure detecting chamber 82 into two compartments. The chamber inlet 821 and the inlet pipe 72 are provided in the two compartments respectively. The chamber partition panel 822 has a bottom portion through which a partition hole 8221 is provided such that the two compartments are capable of interconnecting with each other. The provision of the chamber partition panel 822 is to prevent any steam from flowing to the pressure sensor 7 directly and to reduce the speed of the steam flowing to the pressure sensor 7, thereby reducing the impact of steam onto the pressure sensor 7 when the amount of steam is large and ensuring the stability of the pressure sensor 7. In addition, the chamber partition panel 822 can also reduce the amount of water resulted from condensation flowing to the pressure sensor 7. The inlet pipe 72 of the pressure sensor 7 is extended from a bottom surface of the pressure detecting chamber 82.

Referring to FIG. 3 of the drawings, the electric steamer according to the preferred embodiment of the present invention is illustrated. The inlet pipe 72 has an upper end which is located at a position higher than an upper end of the partition hole 8221. The reason for this design is that when a user adds water to the water chamber 41 through the water inlet 31 carelessly, and the water level becomes higher than the position of the partition hole 8221, a water sealing effect is formed because the air in the partition hole 8221 cannot be exhausted. The water cannot enter into the pressure detecting chamber 82, thereby preventing water from flowing to the pressure sensor 7 through the inlet pipe 72.

The steamer chamber 2 further comprises a temperature sensor. The temperature sensor is used to the temperature inside the steamer chamber 2 so as to transmit temperature data for control.

In order to simplify the design, the inlet pipe 72 can also be directly extended from a bottom surface of the fluid receiving unit 3. In this way, the steam arrangement 8 between the inlet pipe 72 and the water chamber 41 can be eliminated such that the cost is lowered.

According to the preferred embodiment of the present invention, the pressure sensor 7 is a pressure switch which comprises a sampling port 71 and an inlet pipe 72. The sampling port 71 is installed in such a manner that the sampling port 71 is communicating with an external environment and its working principle is that: when the pressure reaches the working pressure of the pressure switch, the pressure switch is connected; when the pressure is lower than the working pressure of the pressure switch, the pressure switch is disconnected. In other words, this type of pressure sensor 7 (pressure switch) has an output signal of "connect" or "disconnect" working signal. In practice, other type of pressure sensor with output voltage values output signal based on the changes in values of the steam pressure can also be used as the detection element for the steam pressure, and a control process of the control circuit can be adjusted to implement this function. According to this preferred embodiment of the present invention, the position of the pressure detecting chamber 82 and the residual gas outlet 811 can be adjusted according to the need and function requirements. The principle of the adjustment is that: the position has to be higher than a water level so as to ensure that water will not flow through the inlet pipe 72 to the pressure sensor 7 while the steam from the steam chamber 2 can flow into the inlet pipe 72 smoothly.

Figure 4:
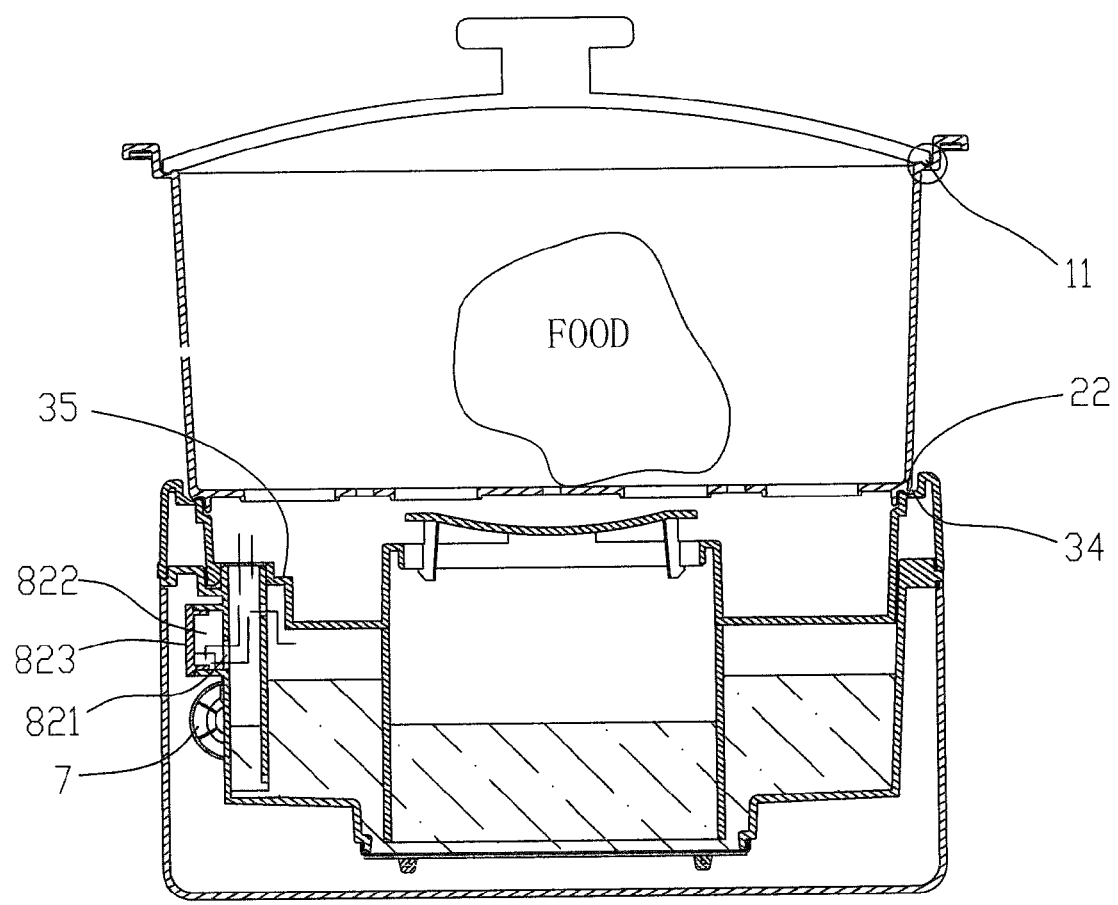
FIG. 4 is a cross-sectional illustration of the electric steamer according to a second preferred embodiment of the present invention.

Referring to FIG. 4 of the drawings, an operation process according to the preferred embodiment of the present includes the steps of: (1) when a user needs to steam a food object, adding a suitable amount of water into the water chamber 41 as required, wherein the water being added is not exceeding the maximum water level as indicated in the water chamber 41; (2) stacking the fluid receiving unit 3 onto the water chamber 41; (3) stacking the steam chamber 2 onto the fluid receiving unit 3; (4) opening the steamer cover 1 and placing the food object into the steam chamber 2; (5) covering the steam chamber 2 with the steamer cover 1; (6) plugging the power cord to power supply and selecting a steaming mode and time, then pressing "start" to start the steaming process of the electric steamer.

After the steaming process is started, the water inside the partition member 6 is heated by the heating unit 5 rapidly until the water is boiled to generate steam, then the steam flows into the steam chamber 2 through the gas outlet 32 on an upper end of the partition member 6. When the steaming process begins, since the temperature of the food object and the steam chamber 2 are much lower than that of the steam, some of the steam will be cooled by the food object and a volume of the steam is reduced. At this moment, a heat absorption process of the food object and the steam chamber 2 occurs. Because a steam pressure inside the steam chamber 2 is relatively small, only a small amount of steam will flow towards the steam channel 81 and eventually to an upper end of the water chamber 41 slowly through the residual gas outlet 811 on the upper end of the steam channel 81. Because the water chamber 41 communicates with the external environment through the water inlet 31, and the flow rate of the steam is slow, a difference between the pressure inside the residual gas outlet 811 and the pressure at an upper end of the water chamber 41 are not significant, therefore the pressure is stable.

After a period of time of heating, the amount of steam is increased and the heat absorption rate of the food object is decreased, the pressure of the steam in the steam chamber 2 is increased gradually. When the amount of steam is not very large, the steam flows to the steam channel 81 of which some of the steam flows into the pressure detecting chamber 82 through the steam channel 81. Because the pressure is small, the steam cannot initiate the operation of the pressure sensor 7. Meanwhile, some of the steam is cooled by the water at room temperature in the steam channel 81 and any excess steam is exited to the water chamber 41 through the residual gas outlet 811 and is cooled and absorbed by the water at room temperature in the water chamber 41.

When the heating unit 5 continues the heating process, the amount of steam is increased and the heat absorption rate of the food object is decreased, and the pressure of the steam inside the steam chamber 2 is increased continuously and substantively, the steam is not only provided to the steam chamber 2, but also to the steam channel 81. Except that a portion of the steam flows to the water chamber 41 through the residual gas outlet 811, the majority of the steam flows to the inlet pipe 71 through the chamber inlet 821 and the partition hole 8221. The steam channel 81 can also function to prevent water flowing to the pressure sensor through suppressing water movement in the water chamber 41 caused by rupture of water bubble into water droplets when a large amount of steam is generated by heating water by the heating unit 5. A position of the inlet pipe 72 is at a higher level than that of the bottom surface of the pressure detecting chamber 82 in order to prevent water from the water chamber 41 flowing into the pressure sensor 7. When a pressure of the pressure detecting chamber 82 reaches the working pressure level of the pressure sensor 7, the pressure sensor 7 starts working (connect), after the control circuit receives the signal from the pressure sensor 7, a control signal is generated and transmitted to cut off the power supply to the heating unit 5 such that the heating unit 5 is stopped (or based on the heating power, heating time, the number of times of on/off status of the pressure sensor 7, programming to control the heating unit 5 to cut off and stop heating). When the heating unit 5 is switched off, the steam inside the steam chamber is decreased continuously and the pressure is decreased gradually. When the pressure inside the steam chamber 2 is decreased to a level at which the pressure sensor 7 is working, the pressure sensor 7 starts working (disconnect), after the control circuit receives the signal from the pressure sensor 7, a control signal is generated and transmitted to connect the power supply to the heating unit 5 such that the heating unit 5 is switched on again and the heating process is resumed (or based on the heating power, heating time, the number of times of on/off status of the pressure sensor 7, programming to control the heating unit 5 to connect to the power supply and continue the heating process).

According to this embodiment of the present invention, a regular electric steamer without any special sealing arrangement structure is used. In other words, there is no special sealing arrangement between the steam chamber 2 and the fluid receiving unit 3 and there is no special sealing arrangement between the fluid receiving unit 3 and the base 4. That is to say, in this kind of regular electric steamer, after the steam chamber 2, the fluid receiving unit 3 and the base 4 are stacked into position, a sealing operating condition is generated solely based on the connection relationship between the elements of the electric steamer. Through the construction of steam channel 81 between the fluid receiving unit 3 and the water chamber 41, the provision of pressure sensor 7 at a position between the water chamber 41 and the outer casing of the base 4, and the detection of steam pressure inside the steam chamber 2 by the pressure sensor 7, the control circuit is capable of being programmed to control the power supply to the heating unit 5 based on the on/off status of the pressure sensor. Through controlling the heating process of the heating unit 5, the steam quantity generated in the electric steamer is controllable and adjustable, therefore the electric steamer is function under a stable steam pressure environment for steaming the food object. Accordingly, no excessive steam is generated and released from the electric steamer and no uncontrollable steam emission from the electric steamer is occurred. In addition, through programming to control the amount of steam generation of the electric steamer, a heating process is carried out only when heating is necessary, therefore providing a superior energy saving effect while eliminating the inconvenience and safety hazard of high temperate steam generation of the electric steamer. The control circuit is generally a type of control circuit with MCU core, and the steaming and cooking process of a food object is achieved through programming the electric steamer. Moreover, a temperature sensor NTC can also be included in the control circuit such that the operation of the electric steamer can be more humane and intelligent through the control based on the temperature variation and the steam pressure variation.

According to this preferred embodiment, the pressure sensor 7 (pressure switch) can be a low-end and low-cost pressure switch, thereby lowering the cost of product and the cost of manufacture and increasing the competitive strength of the product in the market. The provision of pressure sensor 7 can be employed in regular electric steamer to achieve the objects of energy saving and safety.

Embodiment 2

Figure 5:
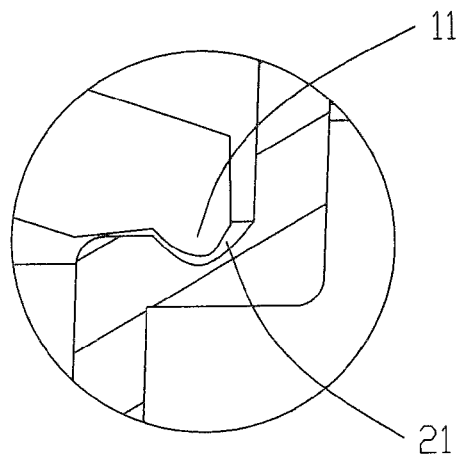
FIG. 5 is a partially enlarged view of a protruded ring I and a water groove I of FIG. 4.

Referring to FIG. 4 and FIG. 5 of the drawings, the electric steamer according to a second preferred embodiment is illustrated. The major differences between the first and the second embodiments are that, in the second embodiment, a protruded ring I11 and a water groove I21 are provided at the connecting junction between the steamer cover 1 and the steam chamber 2 in which the structure of the water groove I21 is complement to the protruded ring I11, a protruded ring II22 and a water groove II34 are provided at the connecting junction between the steam chamber 2 and the fluid receiving unit 3 in which the structure of the water groove II34 is complement to the protruded ring II22.

When water is added to the water groove I21 and the water groove II22 (or after steaming, water is left after condensation), the steamer cover 1 which includes the protruded ring I11 in its bottom peripheral portion is placed on top of the steamer chamber 2 which includes the water groove I21 in its upper peripheral portion. Then the connecting junction or gap between the protruded ring I11 and the water groove I21 is water sealed by the water in the water groove I21, therefore the water in the water groove I21 is function like a sealing ring. When the steam chamber 2 which includes the protruded ring II22 at its bottom peripheral portion is placed on top of the fluid receiving unit 3 which includes the water groove II34 at its upper peripheral portion, a sealing function is also provided. This type of sealing can increase the tightness of the electric steamer, and this type of sealing is advantageous in energy saving, low cost and convenience for use. In addition, this type of sealing also solves the problem of using silica ring for sealing in which strong force is required to separate the steamer cover 1 and the fluid receiving unit 3. However, this type of "water sealing" is only suitable for use when the pressure is not great. When the pressure exceeds the capacity of the water sealing, the water sealing will be broken by the air pressure and fail to provide a sealing function. According to this preferred embodiment, a plurality of steam chamber 2 can be provided and is stackable for use.

Embodiment 3

The major differences between the second and the third embodiments are that, in the third embodiment, a sealing arrangement is provided at the connecting junction between the steamer cover 1 and the steam chamber 2, the connecting junction between the steam chamber 2 and the fluid receiving unit 3, and the connecting junction between the fluid receiving unit 3 and the water chamber 41 respectively. For example, a silicon, soft plastic or rubber sealing ring can be provided at the junction between the steam chamber 2 and the fluid receiving unit 3 such that the junction is sealed. Similarly, a sealing arrangement is provided at the connecting junction between the steamer cover 1 and the steam chamber 2 and the connecting junction between the fluid receiving unit 3 and the water chamber 41 for providing a sealing effect. Though more force is required to separate the steam cover 1 or to separate the steam chamber 2 and the fluid receiving unit 3 after steaming and cooking, the advantage is that the sealing effect is better and more stable and energy saving. It is because a working pressure of the pressure sensor 7 in the steam chamber 2 can be adjusted to a level which is slightly higher than the exterior environment after the addition of these sealing arrangements. Therefore the electric steamer is under a "slightly pressurized" condition, and the work efficiency and steaming cooking speed of the electric steamer is increased while energy saving is achieved.

Embodiment 4

Figure 6:
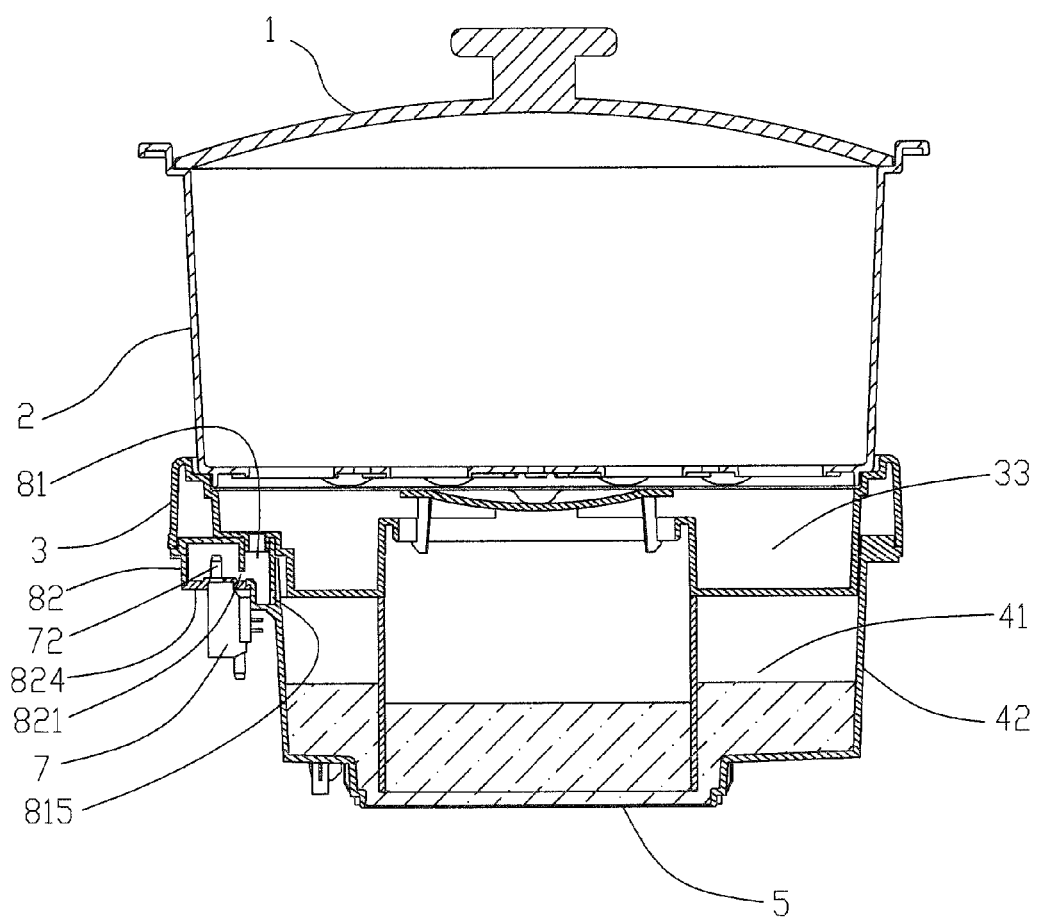
FIG. 6 is an illustration of the embodiment 4 according to the present invention.

Referring to FIG. 6 of the drawings, a steam arrangement according to a second preferred embodiment is illustrated and the outer casing of the base 4 is removed from the figure for illustration. Compared to the first embodiment, the steam arrangement according to the second preferred embodiment does not include a chamber partition panel 822, the water returning hole 812 and the residual gas outlet 811 in the first embodiment is simplified to a water returning hole II 815, wherein the water returning hole II 815 is provided at the lowest end of the steam channel, wherein an upper end of the inlet pipe 72 is positioned at a level higher than that of an upper end of the chamber inlet 821, the water returning hole II 815 is positioned at a level higher than the maximum water level required by the water chamber 41, and the water returning hole II 815 is positioned at a level lower than that of the chamber inlet 821. According to this embodiment, the chamber side panel 823 is converted into a chamber bottom panel 824 for facilitating the installation of the pressure sensor 7 during assembly.

The reason for positioning the upper end of the inlet pipe 72 at a level higher than that of the upper end of the chamber inlet 821 is the same as the reason for positioning the upper end of the inlet pipe 72 at a level higher than that of the upper end of the partition hole 8221 in the first preferred embodiment.

Compared to the first embodiment, this embodiment has a simplified structure, a less complicated molding requirement which is more convenience during manufacturing and low cost advantage.

According to the electric steamer of the above embodiments, a control method of the pressure sensor includes the following steps:

(1) if the electric steamer is connected to the power supply for steaming and cooking process, the control circuit controls to connect the power supply to the heating unit for starting the steaming and cooking process and the control circuit starts to monitor the working status of the pressure sensor;

(2) the control circuit determines if the working status of the pressure sensor meets the status under programming requirement; if the status meets the programming requirement, the power supply to the heating unit is cut off; if not, connect the power supply to the heating unit;

(3) if the steaming and cooking time is reached, the control circuit cut off the power supply to the heating unit and stop the steaming and cooking process.

In step (1), the working status of the pressure sensor is the "connect" and "disconnect" status of the pressure sensor.

In step (1), the working status of the pressure sensor can also be the values of the output voltage.

The step (2) can also be designed according to different requirements. The control circuit determines if the working status of the pressure sensor meets the status under programming requirement; if the status meets the programming requirement, the power supply to the heating unit is disconnected or connected from the power supply based on the programming time. In this embodiment, the pressure sensor only provides a signal for starting the heating control process. The setting of time interval is based on testing data and the object is to provide a stable temperature condition for the electric steamer.

According to the preferred embodiment of the present invention, the principle of the control method of the electric steamer is providing a pressure sensor for detecting a steam pressure of the steam chamber of the electric steamer and controlling the amount of steam generated through controlling a working status of the pressure sensor and a heating process of the heating unit. Therefore, a steam pressure in the steam chamber of the electric steamer is controlled in such a manner that the electric steamer is capable of providing a stable and suitable pressure during the steaming and cooking process, therefore eliminating the safety hazards of excessive gas emission and uncontrollable gas ejection, while providing the energy saving advantage. The control circuit is control circuit with MCU core or digital circuit and analog circuit.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electric steamer, comprising:
   a steamer cover,
   at least one steamer chamber that is covered by said steam cover,
   a fluid receiving unit having a water inlet and a gas outlet,
   a base, wherein said steam cover, said steam chamber, said fluid receiving unit are sequentially arranged from a top to a bottom of the electric steamer, wherein said base has a heating unit, a water chamber communicating with said water inlet of said fluid receiving unit, and a control circuit provided in said base, wherein said base further comprises a pressure sensor and a pressure sensor inlet pipe connected to said fluid receiving unit, wherein said pressure sensor, which is provided at said pressure sensor inlet pipe, has a signal output terminal connected to said control circuit through a connecting wire, and
   a partition member provided on top of said heating unit, wherein said heating unit is arranged for heating up water within said partition member to generate steam to flow into said steam chamber through said gas outlet of said fluid receiving unit.

2. The electric steamer, as recited in claim 1, further comprising a steam arrangement between said pressure sensor inlet pipe and said fluid receiving unit, wherein said steam arrangement comprises a steam channel and a pressure detecting chamber, wherein said pressure sensor inlet pipe is mounted inside said pressure detecting chamber, wherein an upper end of said steam channel is connected to said fluid receiving unit, wherein said pressure detecting chamber has a chamber inlet connected to said steam channel.

3. The electric steamer, as recited in claim 2, wherein said fluid receiving unit further comprises a stair-shaped member provided at a bottom portion thereof, wherein said upper end of said steam channel is connected within said stair-shaped member.

4. The electric steamer, as recited in claim 2, wherein said chamber inlet is positioned towards a bottom portion of said pressure detecting chamber, wherein said chamber inlet is positioned at a level higher than a maximum water level of said water chamber.

5. The electric steamer, as recited in claim 2, wherein said steam channel has a water returning hole provided at a bottom end of said steam channel, wherein said water returning hole is positioned at a level lower than a minimum water level of said water chamber.

6. The electric steamer, as recited in claim 2, wherein said steam arrangement further has a residual gas outlet provided at an upper end of the steam channel, wherein said residual gas outlet is positioned at a level higher than the maximum water level of said water chamber.

7. The electric steamer, as recited in claim 2, wherein said pressure detecting chamber further comprises a chamber partition panel, wherein said chamber partition panel divides said pressure detecting chamber into two chamber compartments, wherein said chamber inlet and said pressure sensor inlet pipe are provided in said two chamber compartments respectively, wherein said chamber partition panel has a partition hole provided at a bottom portion of said chamber partition panel such that said two chamber compartments are capable of communicating with each other.

8. The electric steamer, as recited in claim 7, wherein an upper end of said inlet pipe is positioned at a level higher than that of an upper end of said partition hole.

9. The electric steamer, as recited in claim 2, wherein an upper end of said inlet pipe is positioned at a level higher than that of an upper end of said chamber inlet.

10. The electric steamer, as recited in claim 7, wherein said inlet pipe is outwardly extended from a bottom surface of said pressure detecting chamber.

11. The electric steamer, as recited in claim 9, further comprising a temperature sensor in said steam chamber.

12. The electric steamer, as recited in claim 9, further comprising, a protruded ring I and a water groove I provided at a connecting junction between said steamer cover and said steam chamber.

13. The electric steamer, as recited in claim 9, further comprising a protruded ring II and a water groove II provided at a connecting junction between said steam chamber and said fluid receiving unit.

14. The electric steamer, as recited in claim 1, wherein said inlet pipe is outwardly extended from a bottom surface of said fluid receiving unit.

* * * * *